Aug. 5, 1969 E. FELDTKELLER ET AL 3,459,517

MEMORY ELEMENT WITH STACKED MAGNETIC LAYERS

Filed April 13, 1966

INVENTORS
Ernst Feldtkeller
Karl-Ulrich Stein
BY Hill & Hill
ATTYS.

United States Patent Office 3,459,517
Patented Aug. 5, 1969

3,459,517

MEMORY ELEMENT WITH STACKED MAGNETIC LAYERS

Ernst Feldtkeller and Karl-Ulrich Stein, Munich, Germany, assignors to Siemens Aktiengesellschaft, Munich, Germany, a corporation of Germany Filed Apr. 13, 1966, Ser. No. 542,362
Int. Cl. G11b 5/66
U.S. Cl. 29—191 2 Claims

ABSTRACT OF THE DISCLOSURE

A memory element composed of alternating layers of magnetic and electrically conductive non-magnetic materials wherein the magnetic layers are free of non-magnetic layers at the peripheral zones and extend generally parallel to the magnetically easy axis.

The present invention relates to a memory element which, in accordance with the teaching disclosed in United States patent application Ser. No. 440,646 of the same applicant (now Patent No. 3,375,091) may consist of several magnetic layers superimposed one upon another in stack form and seperated from one another, in each case, by nonmagnetic interlayers, preferably of the same material. Layers of silicon oxide, silicon dioxide and preferably at least partially electrically conducting nonmagnetic interlayers can be utilized as interlayers.

Investigations have shown, in this connection, that magnetic layers which are separated from one another by interlayers of the aforementioned type are largely free of Bloch line displacements and, thereby, of "creeping" of the walls leading to information breakdown. The use of at least partially electrically conducting nonmagnetic interlayers offers the further advantage that the lower magnetic field strength limit for the coherent rotation, that is, the threshold field strength $H_{rot}$ and the threshold field strength $H_{irr}$ for the information breakdown are placed so close together that a coincidentally controllable information storer with sufficiently wide tolerance ranges for the threshold field strengths and the control fields thereby becomes possible. If the storage element, i.e., its magnetic layers, are saturated after each control impulse and thereby are in one-domain state at the commencement of each change-over, the threshold field strength for the complete coherent rotation change is substantially dependent only on the crystallite magnitude of the layers and is not influenced by the nonmagnetic interlayers. It must, of course, be here taken into account that a storage element in operation in its saturated state is never designated as one-domain state, because it is constantly being switched by pulse-like control fields of constant strength which are insufficient for the saturation, possibly being continuously switched back and forth. If a control pulse is just sufficient to completely change over a layer which is in its one-domain state, and control pulses of uniform strength are involved, there will be observed, after a series, of switching opeartions, a decrease in the switchable range and thereby a reduction in the output signal.

With the aid of the magneto-optical Kerr effect, for example, it is possible to here determine that a one-domain layer, which is changed over by a brief magnetic field pulse whose strength suffices to remagnetize the greatest part of the layer, retains in its peripheral zones parallel to the magnetically easy axis narrow, unchanged strips. If through a second pulse of equal strength and opposite polarity to the field component lying parallel to the easy axis the central area of the magnetic layer is again changed back into its initial state, the walls which were formed in the change-over in the area of the corresponding peripheral zones of the layer do not disappear, as would be expected, but there is formed in each case a second wall which is aligned parallel to the corresponding first wall. This process is repeated in each change-over until, under some circumstances, the entire magnetic layer is split up into narrow strip-shaped domains directed parallel to the magnetically easy axis, as a result of which a change-over can no longer take place. Further control pulses have only the effect that the configuration of the magnetization becomes more regular and thus energetically more favorable.

Investigations have shown that for each pulse duration of the control pulses there is a certain threshold field strength $H_{Block}$ above which this blocking of the magnetic layer does not occur. As in the paripheral portions of the layer, this blocking can also develop from scratches or similar irregulatities in the layer.

The cause of the formation of the first wall or of the first unchanged strip quite possibly may reside in the fact that by reason of the scatter fields which arise during rotation of the magnetization at the peripheral portions of the layer lying parallel to the magnetically easy axis, there arises an area of unhomogeneously oriented magnetization. Directly at the periphery of the magnetic layer, the magnetization remains very nearly parallel to the edge, whereby a high surface pole density and the great dispersion field energy associated therewith are eliminated. The peripheral portions, therefore, remain magnetized in the initial direction during the rotation.

The cause for the nondisappearance of the wall in the change-over of the element back into the initial position is not yet fully explained. The transformation of an initially very broad wall into a narrower, very much more immovable, wall may have something to do with it.

Experimentally it was determined that the threshold field strength $H_{Block}$ for a memory element composed of mutiple layers as described in said application Serial No. 440,646, is higher than that for simple layers, deposited at the same temperature, of the same total nickel-iron layer thickness.

The present invention has as its underlying problem that of providing storage elements of the type initially mentioned which, with retention of the above-mentioned advantages (relatively high threshold strength $H_{irr}$ for the information breakdown) have as low as possible a threshold field strength $H_{Block}$ with respect to the above-descirbed blocking, so that the storage elements can be changed over as often as desired even by brief control pulses of low strength.

For the solution of this problem the invention provides, in a magnetic thin-layer storage element with magnetic layers superimposed on one another in stack form and separated from one another by nonmagnetic interlayers, preferably at least partially electrically conducting, an arrangement in which the magnetic layers are free of interlayers in areas of their peripheral zones, and it may be sufficient in some cases if such free areas merely comprise the peripheral areas extending approximately parallel to the magnetically easy axis.

By utilization of the two proposals it is achieved that for the formation of the first walls in the proximity of the border, the lower threshold field strength $H_{Block}$ of the simple layers is determinative.

For the avoidance of blocked areas which are due to scratches in the layer, it is further proposed according to the invention that the interlayers of the magnetic thin layer storage element be subdivided into strips separated from one another, extending parallel to the magnetically easy axis. The areas free of interlayers will then always be changed over analogously to the interlayer-free border areas of the magnetic layers whereby the strips affected by the scratches or the border are insulated from the unaffected strips of the layer.

In the drawing, wherein like reference characters indicate like or corresponding parts, there are illustrated examples of construction of the invention, in which.

Figures 1, 2:
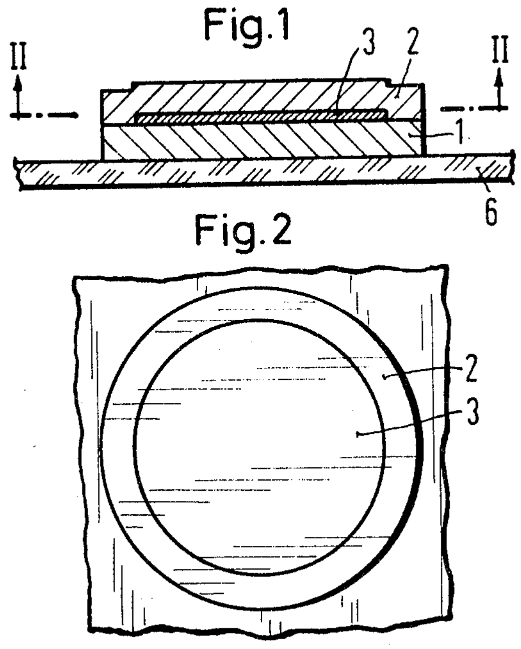
FIG. 1 is a sectional view of a storage element according to the invention.
FIG. 2 is a plan view of a storage element divided approximately along the line II—II in FIG. 1.

Referring to FIG. 1, reference numeral 1 designates a thin magnetic layer of a preferential axis of magnetization, applied to a carrier 6, for example, vaporized thereon. As carrier, there can be utilized a cleaned, dried, glass plate on which there is applied, for example, at about 200° C., a magnetostrictive-free nickel-iron layer having a thickness of 25 mμ. In the central area of its layer face remote from the carrier 6, such magnetic layer is covered with a nommagnetic electrically conducting layer 3, for example, of copper. The layer 3 and also the interlayer-free peripheral areas of the magnetic layer 1 are covered with a further magnetic layer 2 of the same direction of magnetization.

Figure 3:
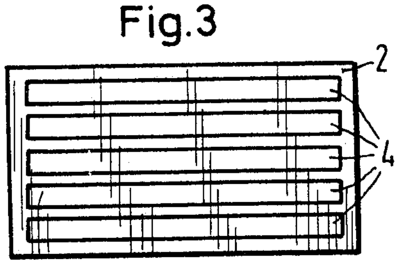
FIG. 3 illustrates a further example of construction according to the invention similar to that represented in FIG. 2.
Figure 4:
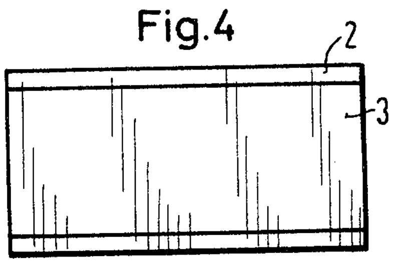
FIG. 4 illustrates a further example of construction according to the invention, likewise similar to that illustrated in FIG. 2.

In the example of construction according to FIG. 3, a nonmagnetic interlayer is divided into strips 4, while, in contrast thereto, in the example of construction according to FIG. 4, only the peripheral areas of magnetic layers 1 and 2 extending parallel to the magnetically easy axis are free of interlayers.

Changes may be made within the scope and spirit of the appended claims which define what is believed to be new and desired to have protected by Letters Patent.

We claim:

1. A magnetic thin-layer storage element comprising magnetic layers of preferential axis of magnetization, separated from one another by at least partially electrically conducting non-magnetic interlayers, with said layers being superimposed on one another in stack formation, said magnetic layers being free of said interlayers in areas of their peripheral zones extending approximately parallel to the magnetically easy axis.

2. A magnetic thin-layer storage element comprising magnetic layers of a preferential axis of magnetization, separated from one another by at least partially electrically conducting non-magnetic interlayers, with said layers being superimposed on one another in stack formation, said magnetic layers being free of interlayers in the area of their peripheral zones, said interlayers being constructed in the form of a plurality of strips separated from one another and extending parallel to the magnetically easy axis.

References Cited

UNITED STATES PATENTS

| | | | |
|---|---|---|---|
| 3,089,228 | 5/1963 | Lynch | 29—194 |
| 3,343,145 | 9/1967 | Bertelsen | 340—174 |
| 3,350,180 | 10/1967 | Croll | 29—183.5 |
| 3,375,091 | 3/1968 | Feldtkeller | 29—194 |
| 3,375,503 | 3/1968 | Bertelsen | 340—174 |

L. DEWAYNE RUTLEDGE, Primary Examiner

E. L. WEISE, Assistant Examiner

U.S. Cl. X.R.

29—194, 196; 340—174